(12) United States Patent
Matsen et al.

(10) Patent No.: US 10,899,081 B2
(45) Date of Patent: Jan. 26, 2021

(54) METHODS AND APPARATUS FOR THERMOPLASTIC WELDING

(71) Applicant: The Boeing Company, Chicago, IL (US)

(72) Inventors: Marc R. Matsen, Seattle, WA (US); Bret Alan McGinness Voss, Tukwila, WA (US); Alexander M. Rubin, St. Louis, MO (US); Charles R. Prebil, University City, MO (US)

(73) Assignee: The Boeing Company, Chicago, IL (US)

( * ) Notice: Subject to any disclaimer, the term of this patent is extended or adjusted under 35 U.S.C. 154(b) by 52 days.

(21) Appl. No.: 16/212,598

(22) Filed: Dec. 6, 2018

(65) Prior Publication Data

US 2020/0180231 A1  Jun. 11, 2020

(51) Int. Cl.
*B29C 65/32* (2006.01)
*B29L 31/30* (2006.01)
*B29K 701/12* (2006.01)

(52) U.S. Cl.
CPC .......... *B29C 65/32* (2013.01); *B29K 2701/12* (2013.01); *B29L 2031/3076* (2013.01)

(58) Field of Classification Search
CPC ...................................................... B29C 65/32
See application file for complete search history.

(56) References Cited

U.S. PATENT DOCUMENTS

| | | | | |
|---|---|---|---|---|
| 3,528,867 A * | 9/1970 | Heller, Jr. | ......... | B29C 66/81871 156/272.4 |
| 4,781,304 A * | 11/1988 | Lapeyre | ................ | B65B 51/227 220/280 |
| 5,624,594 A * | 4/1997 | Matsen | ................... | B32B 37/06 219/633 |
| 5,641,422 A | 6/1997 | Matsen et al. | | |
| 5,723,849 A | 3/1998 | Matsen et al. | | |
| 5,760,379 A | 6/1998 | Matsen et al. | | |
| 6,639,197 B2 * | 10/2003 | Riess | ..................... | B23K 13/01 219/633 |
| 6,884,976 B2 | 4/2005 | Matsen et al. | | |
| 7,126,096 B1 | 10/2006 | Matsen et al. | | |
| 9,586,362 B2 | 3/2017 | Matsen et al. | | |
| 9,868,249 B2 | 1/2018 | Matsen et al. | | |
| 10,058,950 B1 | 8/2018 | Gerkin et al. | | |
| 10,059,054 B2 | 8/2018 | Matsen et al. | | |
| 2017/0165902 A1 | 6/2017 | Matsen et al. | | |

OTHER PUBLICATIONS

Matsen, et al., "Methods and Apparatus for Fabricating Panels," U.S. Appl. No. 16/132,311, filed Sep. 14, 2018, 35 pages.

* cited by examiner

*Primary Examiner* — Daniel McNally

(57) ABSTRACT

An apparatus for thermoplastic welding includes at least one tool configured to support first and second thermoplastic composite parts in a first welding position having one or more joint lines between the first and second thermoplastic composite parts. The tool includes a plurality of induction coils. The apparatus further includes a susceptor removably positioned along the one or more joint lines. The susceptor is configured to heat the one or more joint lines when exposed to a magnetic flux generated by the plurality of induction coils to bond the first and second thermoplastic composite parts along the one or more joint lines. The apparatus also includes a susceptor removal device coupled to the susceptor and configured to remove the susceptor during bonding of the first and second thermoplastic composite parts.

20 Claims, 8 Drawing Sheets

METHODS AND APPARATUS FOR THERMOPLASTIC WELDING

BACKGROUND

Different techniques can be used to form plastic products, such as fabricating thermoplastic panels for aircraft. For example, aircraft are being designed and manufactured with greater percentages of composite materials. Composite materials are used in aircraft to decrease the weight of the aircraft. This decreased weight improves performance features such as payload capacity and fuel efficiency. Further, composite materials provide longer service life for various components in an aircraft.

In manufacturing composite structures, layers of composite material are typically laid or stacked on a tool. For example, layers of fiber sheets pre-impregnated with polymer resin (known as "prepreg") can be laid on the tool, which then form the composite end product. The stacked layers are subsequently processed to form a consolidated composite structure.

During manufacturing and assembly of composite structures, different joining technologies are used, including mechanical fastening, adhesive bonding, and welding. With respect to welding, a thermoplastic weld is created when the thermoplastic material on the surface of two thermoplastic composite components is heated to the melting or softening point and the two surfaces are brought into contact so that the molten thermoplastic mixes. Then, the surfaces are held in contact while the thermoplastic cools below the softening temperature to fuse into the thermoplastic weld. Many of these processes requires a large amount of tooling with added expense, and do not have the rapid welding times needed for high rates of production.

In composite welding, induction welding processes are often used. In these processes, the thermoplastic composite components are placed substantially parallel to the magnetic flux during induction welding processes. In some processes, elements that heat the weld line are positioned between the composite parts and form part of the final composite piece. While these processes allow for more rapid welding, the heating elements become part of the final ("fly away") composite piece, which can add weight and complexity to the final composite piece, as well as impact the design thereof.

Thus, while composite materials, such as thermoplastic composites, can provide improved operating features, the wide-spread use of these components, such as complex thermoplastic composite assemblies, has been limited by these challenges of fabrication. A need exists for a controlled welding process that allows for efficient welding of joints to form the thermoplastic composite components, For example, it is desirable to have a rapid, reliable, affordable, easy to use thermoplastic welding process without the need for "fly-away" elements.

SUMMARY

With those needs in mind, certain examples of the present disclosure provide an apparatus for thermoplastic welding that includes a first tool and a second tool configured to support first and second thermoplastic composite parts in a first welding position having one or more joint lines between the first and second thermoplastic composite parts. At least one of the first and second tools includes a plurality of induction coils. The apparatus further includes a susceptor removably positioned along the one or more joint lines. The susceptor is configured to heat the one or more joint lines when exposed to a magnetic flux generated by the plurality of induction coils to bond the first and second thermoplastic composite parts along the one or more joint lines. The apparatus also includes a susceptor removal device coupled to the susceptor and configured to remove the susceptor during bonding of the first and second thermoplastic composite parts.

Certain examples of the present disclosure also provide a method for thermoplastic welding that includes positioning a first thermoplastic composite part at a welding position and positioning a susceptor along a surface of the first thermoplastic composite part to define one or more joint lines. The method further includes positioning a second thermoplastic composite part on the first thermoplastic composite part with the susceptor between the first and second thermoplastic composite parts at the one or more joint lines. The method also includes generating a magnetic flux using a plurality of induction coils to cause the susceptor to heat the one or more joint lines between the first and second thermoplastic composite parts. The method additionally includes removing the susceptor from the one or more joint lines after the heating of the one or more joint lines and prior to the bonding of the first and second thermoplastic composite parts.

Certain examples of the present disclosure also provide a system for thermoplastic welding that includes a tool configured to support first and second thermoplastic composite parts in a first welding position having one or more joint lines between the first and second thermoplastic composite parts. The system further includes a magnetic field generator configured to generate magnetic flux and a susceptor removably positioned along the one or more joint lines. The susceptor is configured to heat the one or more joint lines when exposed to the magnetic flux to bond the first and second thermoplastic composite parts along the one or more joint lines. The system also includes a susceptor removal device coupled to the susceptor and configured to remove the susceptor during bonding of the first and second thermoplastic composite parts.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

Figure 1:
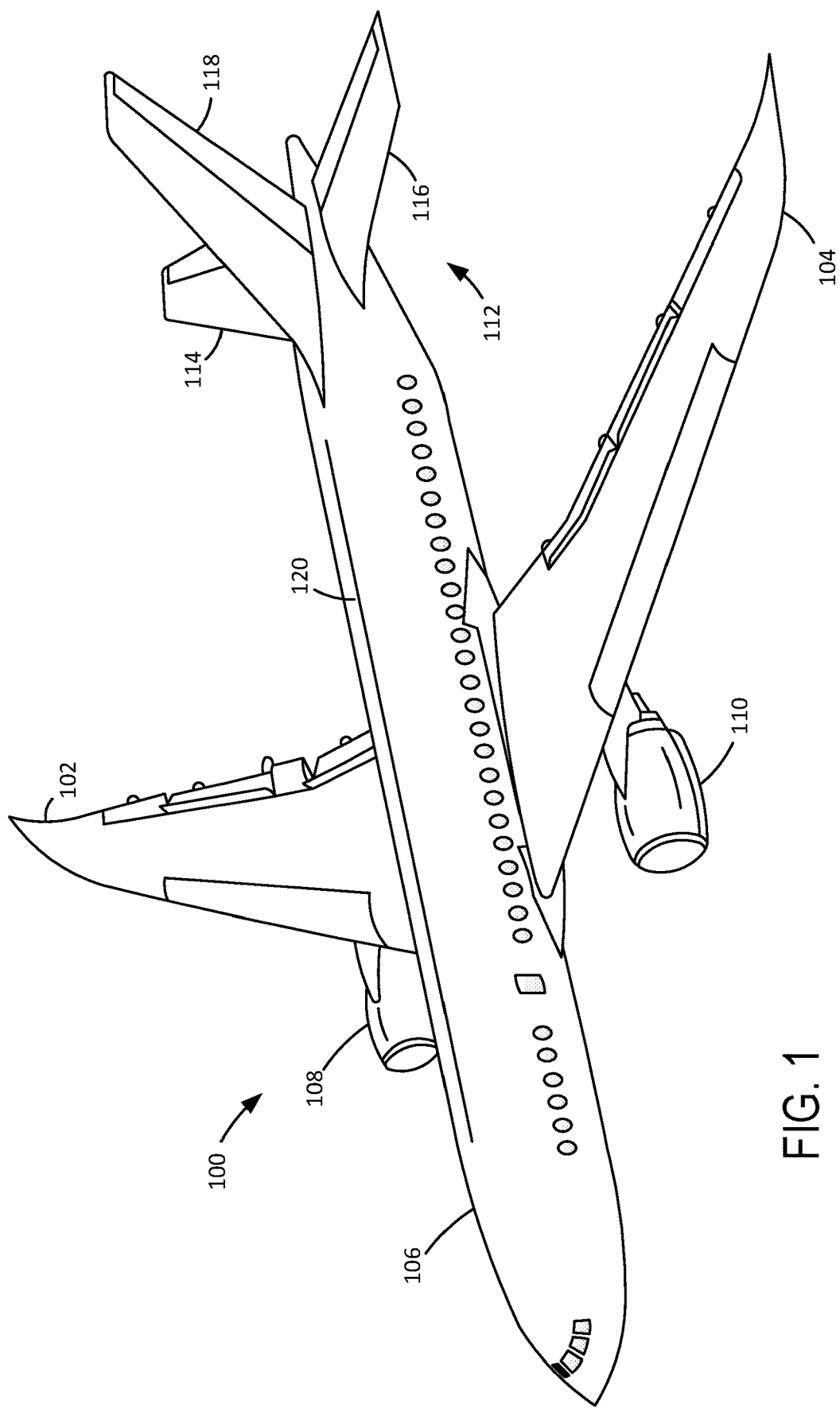
FIG. 1 is an illustration of an aircraft including composite parts fabricated according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain embodiments of the present disclosure include apparatus and methods for fabrication of plastic parts, such as integrally stiffened thermoplastic panels. In some examples, susceptors are used for induction welding that enables a magnetic field from a coil to interact with the parts and the susceptors. For example, susceptor wires located in joints enable rapid induction heating of the joint area to melt the thermoplastic material to produce a welded thermoplastic composite component.

Various embodiments allow for localized thermoplastic welding along a joint line using localized susceptors to form the melt of the bond line of resin without requiring the susceptors to remain within the bond line. For example, a method of localized thermoplastic welding along a joint line allows for the susceptors to be removed (following localized susceptors melting the bond line resin) with the application of bond line compactive pressure, thereby producing a welded joint without a co-bonded insitu susceptor. Thus, the susceptors do not remain within the bond line after welding of the thermoplastic composite parts. Rapid and precise localized heating during thermoplastic welding thereby results, with a final fabricated part that does not have any susceptors that "fly away" with that part.

A rapid, affordable, and controlled/repeatable method for producing integrally stiffened thermoplastic panels is provided, which can also increase the affordability of fabrication of composite components, without the susceptors remaining in the final produced part.

One or more examples allow for fabrication of thermoplastic composite parts, such as thermoplastic aircraft parts for an aircraft 100 as illustrated in FIG. 1. The aircraft 100 has a wing 102 and a wing 104, both attached to a body 106. The aircraft 100 also includes an engine 108 attached to the wing 102 and an engine 110 attached to the wing 104. The body 106 has a tail section 112 with a horizontal stabilizer 114, a horizontal stabilizer 116, and a vertical stabilizer 118 attached to the tail section 112 of the body 106. The body 106 in some examples has a composite skin 120.

The aircraft 100 is an example of an aircraft in which welded thermoplastic structures can be implemented in accordance with various examples described herein. In one particular example as described in more detail herein, the landing gear door (not shown in FIG. 1) of the aircraft 100 is a welded thermoplastic structure formed according to the present disclosure. In other examples, a structural support such as a spar, rib, or other structural support of the wing 102, the wing 104, or the body 106 welded to another component comprises a thermoplastic structure. For example, a structural support of the body 106 welded to the composite skin 120 can comprise a welded thermoplastic structure wherein the final part does not include a "fly away" elements used during fabrication.

The illustration of the aircraft 100 is not meant to imply physical or architectural limitations to the manner in which an illustrative configurations can be implemented. For example, although the aircraft 100 is a commercial aircraft, the aircraft 100 can be a military aircraft, a rotorcraft, a helicopter, an unmanned aerial vehicle, or any other suitable aircraft.

Additionally, although the illustrative examples are described with respect to an aircraft, the present disclosure can be applied to other types of platforms. The platform can be, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
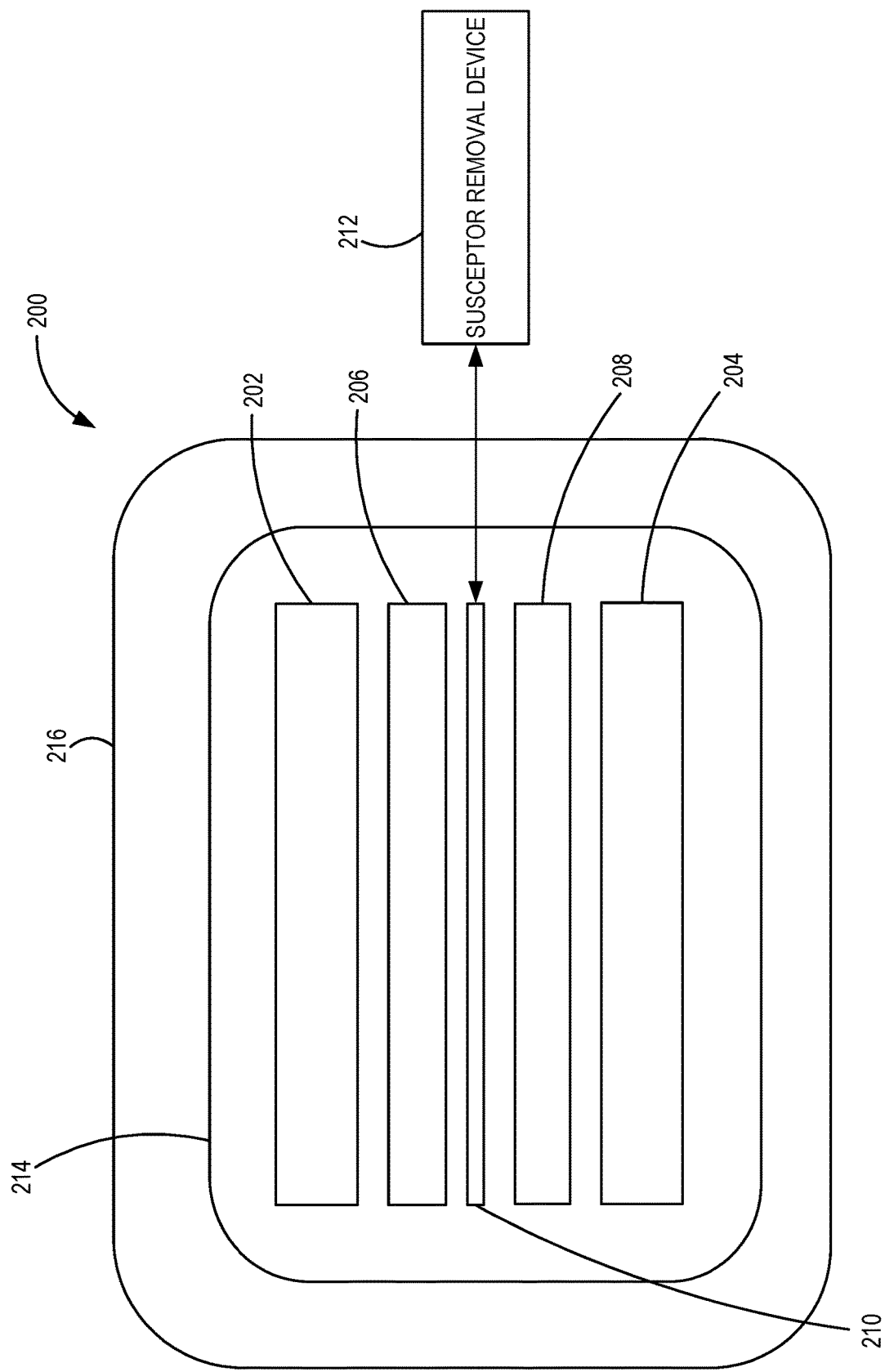
FIG. 2 is an illustration of an apparatus for thermoplastic welding according to an embodiment of the present disclosure.
Figure 3:
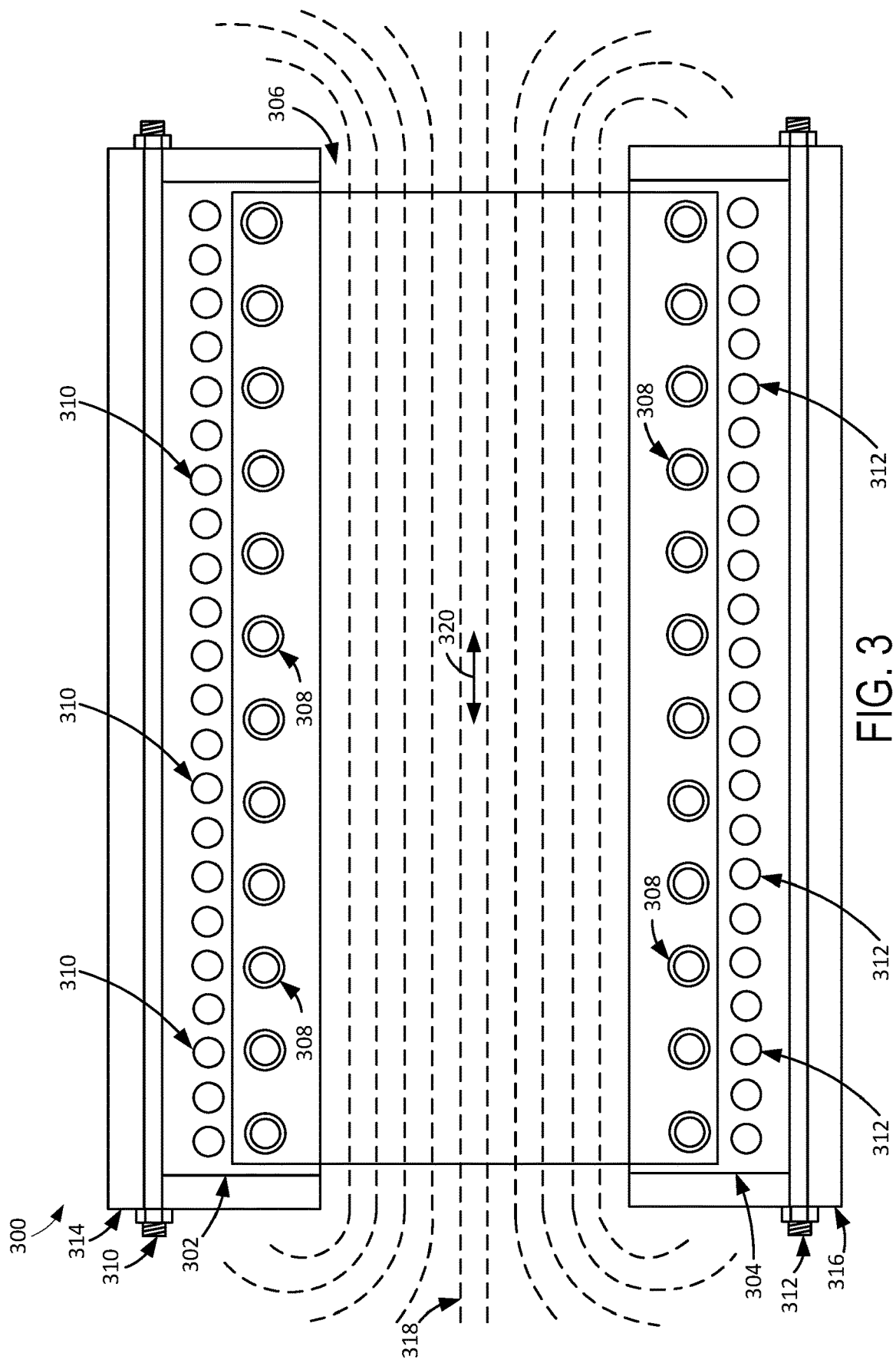
FIG. 3 is an illustration of a cross-sectional view of a tool according to an embodiment of the present disclosure.

Additionally, it should be appreciated that the present disclosure can be applied to any thermoplastic structure (fiber reinforced or not). As such, the various examples are not limited to thermoplastic composites. FIG. 2 is an illustrative example of an apparatus 200 for thermoplastic welding. The apparatus 200 is configured in some examples to perform induction welding of thermoplastics using susceptors. It should be appreciated that FIG. 2 is a general overall illustration. A more detailed illustration and description of a particular environment for thermoplastic welding is illustrated in FIG. 3.

The apparatus 200 generally includes a first tool 202 and a second tool 204 configured to support first and second thermoplastic composite parts 206, 208 in a welding position. In some examples, the first and second tools 202, 204 are configured as dies. The first and second tools 202, 204 in some examples are resin tooling. In one example, the first and second tools 202, 204 are fabricated using an additive manufacturing process.

The apparatus 200 is configured to weld one or more joint lines between the first and second thermoplastic composite parts 206, 208 using a susceptor 210 that is caused to generate heat by a plurality of induction coils as described in more detail herein. In various examples, at least one of the first and second tools 202, 204 includes the plurality of induction coils.

More particularly, to perform welding operation, the susceptor 210 is removably positioned along the one or more joint lines and is configured to heat the one or more joint lines when exposed to a magnetic flux generated by the plurality of induction coils configured as a magnetic field generator 214. The heating bonds the first and second thermoplastic composite parts 206, 208 along the one or more joint lines. For example, the susceptor 210, when subjected to the magnetic flux, heats and causes melting of the first and second thermoplastic composite parts 206, 208 along the one or more joint lines wherein the susceptor 210 is positioned.

The apparatus 200 in the illustrated example includes a susceptor removal device 212 coupled to the susceptor 210 and configured to remove the susceptor 210 during bonding of the first and second thermoplastic composite parts 206, 208. For example, as heat is applied to the one or more joint lines by the susceptor 210, which causes the material of the first and second thermoplastic composite parts 206, 208 to melt along the one or more joint lines, the susceptor removal device 212 is configured to remove the susceptor from between first and second thermoplastic composite parts 206, 208. That is, in various examples, the susceptor removal device 212 is operable to remove the susceptor 210 prior to the bonding, during the bonding, of at the end of the heating at the one or more joint lines. As such, during heating of the one or more joint lines of the first and second thermoplastic composite parts 206, 208 to bond the first and second thermoplastic composite parts 206, 208, such as with the inductive heating by the susceptor 210 when a magnetic field is applied thereto, the susceptor removal device 212 causes the susceptor 210 to be removed from between the first and second thermoplastic composite parts 206, 208.

It should be noted that a plurality of susceptors 210 are positioned along multiple joint lines in some examples. The magnetic flux applied to the plurality of susceptors 210 causes heating thereof to weld the joints. For example, the plurality of susceptors 210 inductively heat in the magnetic field to the curie point and then stops heating. Thus, in some examples, the material of the susceptors 210 is selected to have a curie point that allows for melting of the first and second thermoplastic composite parts 206, 208 along the one or more joint lines.

In some examples, the plurality of susceptors 210 are configured as susceptor wires and positioned between surfaces of the first and second thermoplastic composite parts 206, 208. It should be noted that the plurality of susceptors 210 illustrated in some examples are a subset of the total number of susceptors 210 that are included. That is, the plurality of susceptors 210 are shown for ease in illustration and additional susceptors 210 are provided between the various parts in some examples.

The plurality of susceptors 210 are formed of a material configured to generate heat when exposed to a magnetic flux in various examples. The material of the plurality of susceptors 210 can be, for example, a metal, a metal alloy, a ceramic, a metalized film, or any other suitable material. In some examples, the plurality of susceptors 210 comprise a metallic alloy having ferromagnetic properties. In some examples, a ferromagnetic material for the plurality of susceptors 210 is selected based on a desired welding temperature. For example, the material for the plurality of susceptors 210 is selected based on a temperature at which a ferromagnetic material becomes non-magnetic. This temperature is also known as a Curie temperature. A ferromagnetic material in some examples is selected for the plurality of susceptors 210 such that the Curie temperature for the ferromagnetic material corresponds to a desired welding temperature.

The plurality of susceptors 210 in some examples are configured as wires that at low temperature have a magnetic permeability that is high and, thus, the skin depth is small and the magnetic field induces strong eddy currents generating lots of heat; and at higher temperatures have a magnetic permeability that is small and, thus, skin depth is larger than the radius so currents interfere and are weak and generate less heat. The wires forming the plurality of susceptors 210 have a diameter of 0.01 inches in one example. However, the diameter, and other characteristics of the plurality of susceptors 210 can be varied as desired or needed, such as based on magnetic permeability requirements.

Thus, as described herein, in operation, the plurality of susceptors 210 generate heat when exposed to a magnetic flux generated by the induction coils. The plurality of susceptors 210 are used to apply heat to a number of joining points of the first and second thermoplastic composite parts 206, 208 during a welding process as described herein. That is, the plurality of susceptors 210 are placed between components to promote welding thereof, particularly induction welding. The plurality of susceptors 210 can be placed in different orientations. In one example, the plurality of susceptors 210 are placed substantially parallel to a direction of the magnetic flux. When a magnetic field is applied, induced currents are generated circumferentially around the susceptor wires. It should be noted that thermal leveling of the heated plurality of susceptors 210 can be reached at a desired welding temperature due to the decay of the magnetic properties of the wires of the plurality of susceptors 210.

In some examples, the susceptors 210 are placed at all surfaces to be joined. With the application of a magnetic field, the susceptors 210 cause the abutting surfaces to be induction welded together.

One or more components described herein can provide additional functionality, such as during welding operation. In some examples, the first tool 202 (illustrated as a top tool in FIG. 2) is configured to shield induced current within the first and second thermoplastic composite parts 206, 208 and the susceptor 210. In some examples, the first and second tools 202, 204 are configured as heat sinks for thermal control of the bond site. In these examples, the first tool 202 and/or the second tool 204 is configured to perform the additional functionality based on the material of the first tool 202 and/or the second tool 204, the location of the first tool 202 and/or the second tool 204, the size or shape of the first tool 202 and/or the second tool 204, etc.

Variations and modifications are contemplated. For example, only the second tool 204 can be included and used for inductive welding. In this example, the second tool 204 supports the first and second thermoplastic composite parts 206, 208 and includes the plurality of induction coils to generate the magnetic flux to cause the susceptor 210 to heat.

Additionally, in the illustrated example, the first and second thermoplastic composite parts 206, 208 are covered by a vacuum bag 216 (e.g., a Torr® bag). By sealing the vacuum bag 216 to the tooling, which can be accomplished using any vacuum sealing technique, a vacuum chamber is thereby formed that provides weld pressure at one or more bond lines. Thus, in some examples, a vacuum is drawn within the vacuum chamber that forms a sealed cavity. It should be appreciated that in some examples, an inert gas can be introduced into the sealed cavity.

In some examples, the vacuum bag 216 includes a plurality of induction coils (not shown) that are drawn towards the first and second thermoplastic composite parts 206, 208 when the vacuum seal is formed. As such, the induction coils are positioned along and/or adjacent to the various components to facilitate generating the magnetic flux. Thus, different configurations are contemplated having induction coils in one or more tooling members and/or other components, such as the vacuum bag 216.

FIG. 3 illustrates an apparatus 300 in one example illustrating the components used to generate the magnetic field to cause the susceptor 210 to heat the one or more joint lines. For example, the apparatus 300 embodies the magnetic field generator 214 (shown in FIG. 2) and generates the magnetic flux used to cause the susceptors 210 to heat the one or more joint line. In some examples, the susceptors 210 are configured as die liners positioned within elements used to weld the thermoplastic parts and that generate heat when exposed to a magnetic field generated by the tool. In the illustrated example, the apparatus 300 has a first die 302 and second die 304 forming a die cavity 306 of the apparatus 300. It should be appreciated that the illustrated configuration having first and second dies 302 and 304 is merely for example and other configurations are contemplated. For example, configurations having only one die, or using a combination of resin tooling components and elastomeric layers are contemplated as described herein.

A plurality of induction coils 308 runs through the first die 302 and the second die 304. The plurality of induction coils 308 are joined by flexible sections (not shown) in some examples. A plurality of support rods 310 runs through the first die 302 and a plurality of support rods 312 runs through the second die 304. The first die 302 and the second die 304 are held within a load constraint 314 and a load constraint 316. For example, the first and second dies 302 and 304 are attached in the load constraints 314 and 316, respectively, by any suitable fastening device, such as bolting or clamping.

In operation, the plurality of induction coils 308 generates magnetic flux 318. More particularly, the magnetic flux 318 travels in a direction 320 perpendicular to the plurality of induction coils 308 in the die cavity 306. As will be described in more detail herein, the magnetic flux 318 causes the susceptors 210 (shown in FIG. 2) to generate heat to induction weld one or more joints of thermoplastic parts. For example, the apparatus 300 is configured to weld a structure, such as a thermoplastic aircraft part (e.g., a landing gear door for an aircraft). As used herein, welding can include applying elevated temperature, elevated pressure, or elevated temperature and pressure to a thermoplastic material, such that the thermoplastic material flows. The welding results in joining at least two components, such as the thermoplastic composite parts 206, 208 to form a structure in some examples.

In one example, the plurality of induction coils 308 are conformable induction coils formed of a thin gauge wire. In particular, the plurality of induction coils 308 comprise a plurality of lengths of Litz wire. Litz wire in various examples is a graded fine copper wire used to carry high frequency current. Thus, the plurality of induction coils 308 in some examples are conformable to have greater flexibility and when formed of Litz wires, can have lower resistive losses and reduced weight. However, it should be appreciated that the plurality of induction coils 308 can be formed from different materials or elements, which in some examples include rigid induction tooling with induction coils embedded within the resin tooling as illustrated in FIG. 3.

By using at least some conformable induction coils instead of conventional rigid induction tooling with induction coils embedded in the tools, a magnetic field generator can be used to form structures of varying cross-sections, such as the landing gear door. Further, by using conformable induction coils, the magnetic field generator can be less expensive than conventional induction tooling. Yet further, by using conformable induction coils, the magnetic field generator can use fewer resources to store and transport the magnetic field generator.

In some examples, the induction coils 308 can extend across the full length of the thermoplastic composite parts. For example, the induction coils 308 can extend across the full length of first and second thermoplastic composite parts 206, 208 (shown in FIG. 2). However, it should be appreciated that in some examples, the induction coils 308 extend less than the full length of one of one or more of the thermoplastic composite parts. In some examples, the induction coils 308 only extend such that a magnetic field is generated in a desired area. Additionally, the size, shape and spacing between the induction coils 308 can be varied as desired or needed, such as based on the part to be induction welded, the desired magnetic field, etc.

Figure 4:
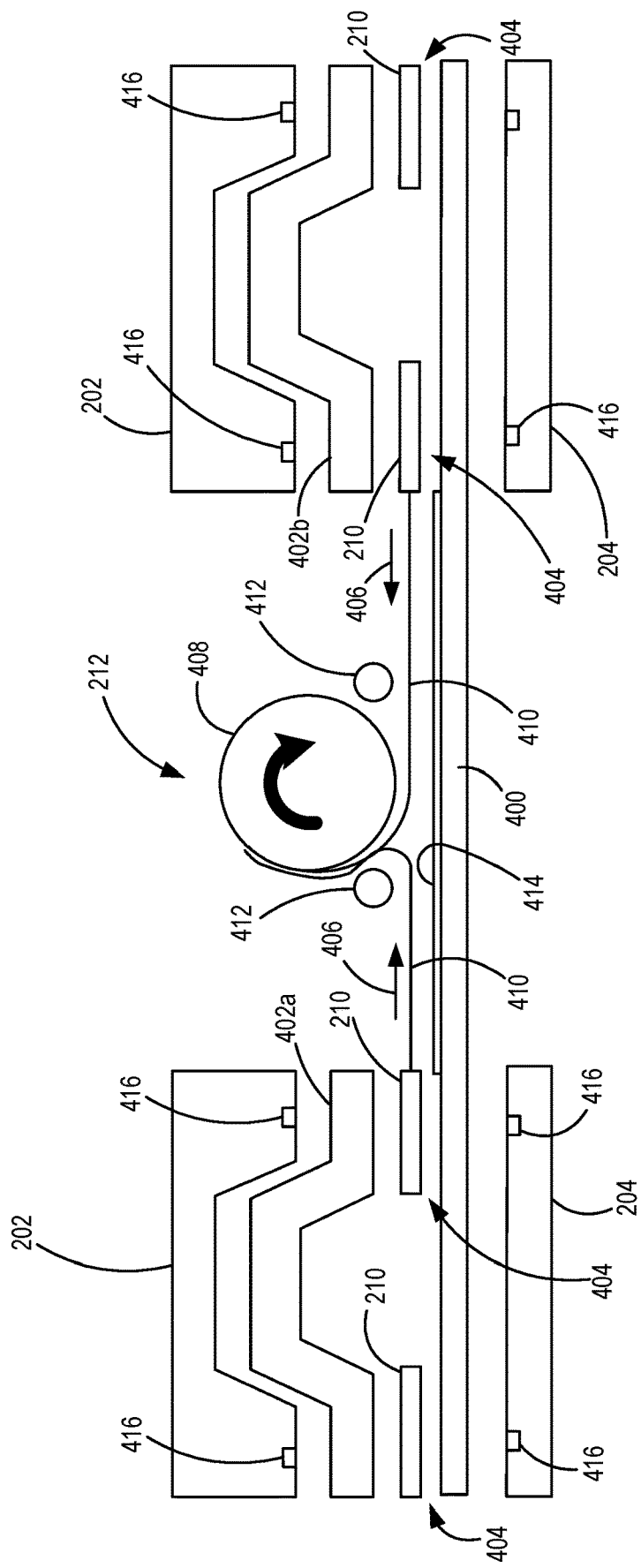
FIG. 4 is an illustration of an apparatus to weld thermoplastic composite parts having a susceptor removal device according to an embodiment of the present disclosure.

With reference now to FIG. 4, removal of the susceptor 210 from the thermoplastic composite parts 206, 208 during welding operation will now be described. Like parts in the various figures are indicated with like reference numerals. It should be appreciated that while FIG. 4 illustrates an example with particular thermoplastic composite parts, the present disclosure can be implemented in connection with different types of thermoplastic composite parts, including having different sizes, shapes, numbers, etc.

In the illustrated example, the thermoplastic composite parts to be welded are a thermoplastic composite sheet 400 and thermoplastic composite stringers 402. As can be seen, susceptors 210 are positioned between the thermoplastic sheet 400 and thermoplastic stringers 402 at joint lines 404. The joint lines 404 generally define welding lines that form bonded or welded joints when the thermoplastic sheet 400 and thermoplastic stringers 402 are bonded together there along. The susceptor removal device 212 is configured to remove the susceptors 210 from between the thermoplastic sheet 400 and thermoplastic stringers 402 during bonding. For example, the susceptors 210 are removed from between the thermoplastic sheet 400 and thermoplastic stringers 402 along an axis perpendicular the stack of thermoplastic sheet 400 and thermoplastic stringers 402. That is, the susceptor removal device 212 is configured to move the susceptors 210 is directions 406 (illustrated by the arrows in FIG. 4) to pull the susceptors 210 away from the joint lines 404. For example, susceptor connectors 410, such as wires coupled to the susceptors 210, are pulled to apply a pulling force on the susceptors 210 to remove the susceptors 210 from between the thermoplastic sheet 400 and thermoplastic stringers 402 during bonding of the thermoplastic sheet 400 and thermoplastic stringers 402.

The mechanism and components that cause a force (e.g., a pulling force) to be applied to the susceptors 210 can be any suitable arrangement. In the illustrated example, the susceptor removal device 212 includes a rotating rod 408 positioned adjacent to the each of the thermoplastic sheet 400 and thermoplastic stringers 402 (defining first and second thermoplastic composite parts on the left side of the rotating rod 408 and first and third parts on the right side of the rotating rod 408). The rotating rod 408 is rotatable to remove the susceptors 210 from the joint lines 404. For example, the rotation of the rotating rod 408 causes the susceptor connectors 410 to pull the susceptors in the directions 406.

In this example, the rotating rod 408 is configured as a center rotating rod between the thermoplastic stringers 402. The positioning of the rotating rod 408 can be changed, such as moved left or right, or up or down, as viewed in FIG. 4.

Figure 5:
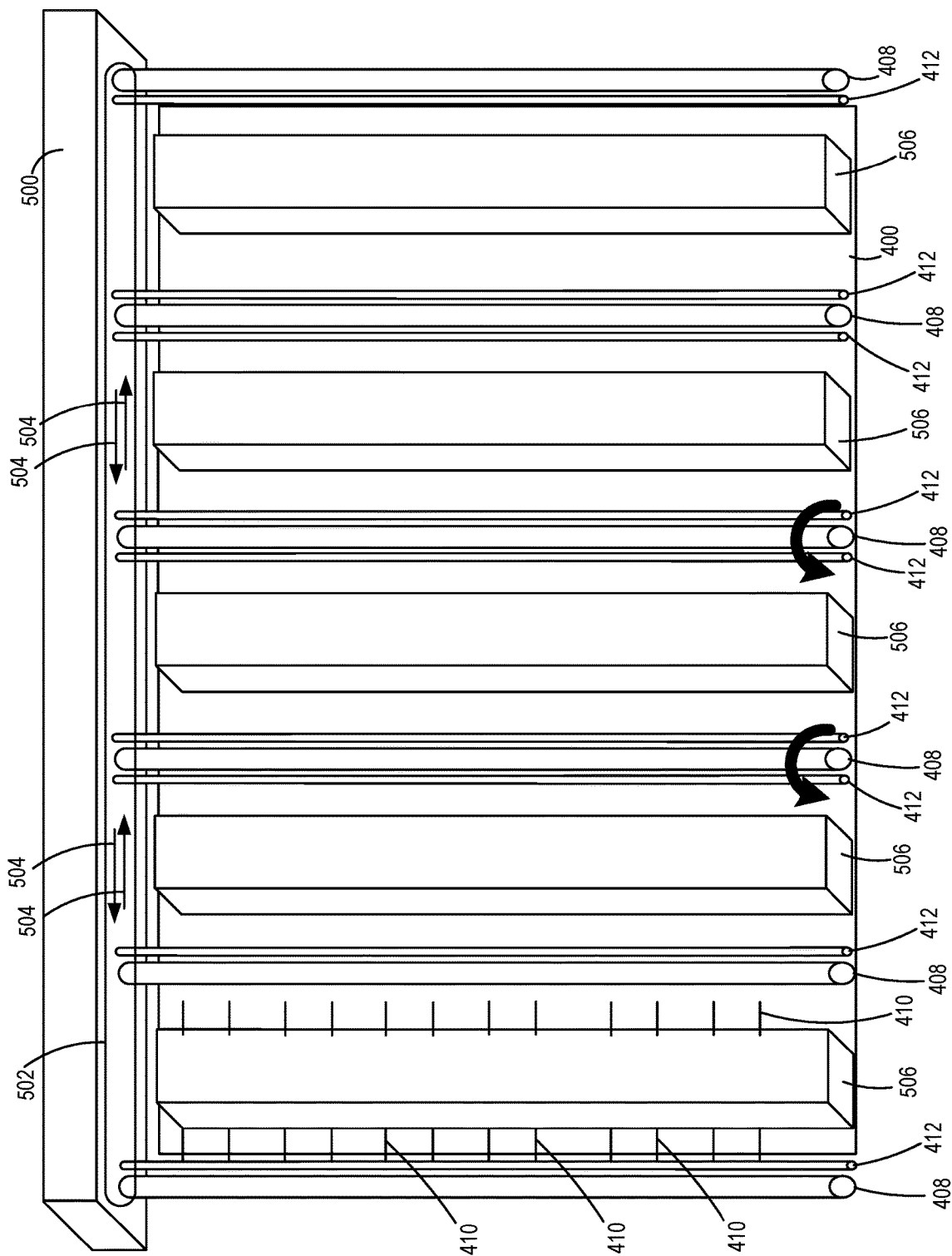
FIG. 5 is an illustration of an apparatus to weld thermoplastic composite parts having a plurality of susceptor removal devices according to an embodiment of the present disclosure.

It should be appreciated that the rotating rod 408 in FIG. 4 only illustrates removal of two adjacent susceptors 210. As described in more detail herein (and as illustrated in FIG. 5), additional rotating rods 408 are poisoned to remove susceptors 210 from other joint lines 404, such as the outer joint lines 404 on the far left and ride sides of the thermoplastic sheet 400 and thermoplastic stringers 402 as viewed in FIG. 4.

In the illustrated example, guide rods 412 are configured to direct the force applied to the susceptors 210. For example, the guide rods 412 are positioned at each side of the rotating rod 408 between the rotating rod 408 and the thermoplastic sheet 400 and thermoplastic stringers 402 to direct the force generated by the rotation of the rotating rod 408 parallel to the joint lines 404 (e.g., bond lines that are formed by the inductive bonding). In the illustrated example, the thermoplastic sheet 400 defines a first thermoplastic composite part and the thermoplastic stringers 402a, 402b define second and third thermoplastic composite parts, wherein the thermoplastic stringer 402a is in a first welding position with respect to the thermoplastic sheet 400 and the thermoplastic stringer 402b is in a second welding position with respect to the thermoplastic sheet 400. As can be seen, joint lines 404 are present between the thermoplastic stringer 402a and the thermoplastic sheet 400, and between the thermoplastic stringer 402b and the thermoplastic sheet 400. The susceptor removal device 212 in the illustrated example is positioned between (i) the thermoplastic stringer 402a and the thermoplastic sheet 400 and (ii) the thermoplastic stringer 402b and the thermoplastic sheet 400. That is, the susceptor removal device 212 is positioned between adjacent thermoplastic composite parts.

In one example, rotation of the rotating rod 408 in a single direction (illustrated as clockwise in FIG. 4) removes the susceptor 210 from the joint lines 404 between (i) the thermoplastic stringer 402a and the thermoplastic sheet 400 and (ii) the thermoplastic stringer 402b and the thermoplastic sheet 400. That is, the guide rods 412 direct the force applied to the susceptors 210 to pull the susceptors 210 toward the rotating rod 408 are remove the susceptors 210 from between (i) the thermoplastic stringer 402a and the thermoplastic sheet 400 and (ii) the thermoplastic stringer 402b and the thermoplastic sheet 400. In this example, the susceptor connectors 410 are coupled with the rotating rod 408 on a same side (illustrated as the left side in FIG. 4) such that clockwise rotation of the rotating rod 408 causes the susceptors 210 from between (i) the thermoplastic stringer 402a and the thermoplastic sheet 400 and (ii) the thermoplastic stringer 402b and the thermoplastic sheet 400 to be removed at the same time. The susceptors 210 can be wound around the rotating rod 408 in some examples.

It should be appreciated that the rotating rod 408 can be configured to rotate in different directions, such as counter clockwise to remove the susceptors 210 from between (i) the thermoplastic stringer 402a and the thermoplastic sheet 400 and (ii) the thermoplastic stringer 402b and the thermoplastic sheet 400, with the susceptor connectors 410 connected to the right side of the rotating rod 408 as viewed in FIG. 4. In some examples, a combination of rotations can be used to remove the susceptors 210 from between (i) the thermoplastic stringer 402a and the thermoplastic sheet 400 and (ii) the thermoplastic stringer 402b and the thermoplastic sheet 400. For example, with a corresponding susceptor connector 410 coupled to each side of the rotating rod 408 at different times, rotation of the rotating rod 408 in a first direction (e.g., clockwise) removes the susceptor 210 from the joint line 404 between (i) the thermoplastic stringer 402a and the thermoplastic sheet 400 and rotation of the rotating rod 408 in a second direction (e.g., counterclockwise) removes the susceptor 210 from the joint line 404 between (ii) the thermoplastic stringer 402b and the thermoplastic sheet 400. As such, selective rotation of the rotating rod 408 removes different susceptors 210. It should be appreciated that multiple rotating rods 408 can be used in some examples to remove the different susceptors 210 (e.g., side by side rotating rods 408).

Thus, the guide rods 412 are aligned with (i) the thermoplastic stringer 402a and the thermoplastic sheet 400 and (ii) the thermoplastic stringer 402b and the thermoplastic sheet 400, and configured to direct the pulling force in the directions 406 parallel to joint lines 404. The pulling force is set at a level that allows for removal of the susceptors 210 from the joint lines 404. For example, the pulling force of the susceptor removal device 212 is set to allow the susceptors 210 to be removed from the melted material of the (i) the thermoplastic stringer 402a and the thermoplastic sheet 400 and (ii) the thermoplastic stringer 402b and the thermoplastic sheet 400. Thus, the pulling force in some examples is set to a level that overcomes the resistance of the melted material, which can be based on the material properties of the thermoplastic stringers 402a, 402b and the thermoplastic sheet 400.

In some examples, a protective layer 414 (e.g., a fluorinated ethylene propylene copolymer coating) is positioned along an exit direction of the susceptors 210, which in FIG. 4 is between the thermoplastic stringers 402a, 402b and above the thermoplastic sheet 400. The protective layer 414 is removably positioned during bonding in some examples to prevent residual molten thermoplastic from the joint lines 404 bonding with the thermoplastic sheet 400 during removal of the susceptors 210. That is, some melted material from the thermoplastic stringers 402a, 402b and/or the thermoplastic sheet 400 can be pulled from the joint lines 404 during removal of the susceptors 210. The protective layer 414 prevents this material from bonding to the thermoplastic sheet 400. The protective layer 414, which is sitting on top of the thermoplastic sheet 400 (e.g., not affixed thereto), is removed after completion of the bonding operation.

In some examples, one or more temperature sensors 416 are positioned and configured to measure a temperature of melted resin along the joint lines 404. For example, the temperature sensors 416 can be positioned within the first and second tools 202, 204 (shown in FIG. 2). It should be appreciated that additional or fewer temperature sensors 416 can be provided. Additionally, the temperature sensors 416 can be positioned at different locations to measure the temperature at the joint lines 404. For example, the temperature sensors 416 can be coupled with other components instead of or in addition to the first and second tools 202, 204. In some examples, the susceptor removal device 212 is configured to remove the susceptors 210 under a tension loading when the melted resin reaches a predetermined temperature (e.g., a minimum melting temperature). That is, within a defined range of temperature based on the material of the thermoplastic stringers 402a, 402b and/or the thermoplastic sheet 400, the susceptor removal device 212 is operable to remove the susceptors 210 from the joint lines 404 of the thermoplastic stringers 402a, 402b and the thermoplastic sheet 400.

It should be noted that the susceptors 210, configured as "smart" susceptors in some examples, inherently have a maximum temperature limit due to the temperature dependent magnetic properties from which they are formed. In various examples, the temperature sensors 416 ensure that the joint lines 404 (or any bond lines) are fully heated up to that temperature before removal of the susceptors 210.

The present disclosure allows for removal of the susceptors 210 from multiple thermoplastic composite parts during bonding of the thermoplastic composite parts. That is, additional thermoplastic composite parts at a plurality of additional welding locations can be provided and the present disclosure allows for removal of the susceptors 210 from the additional thermoplastic composite parts, such as illustrated in FIG. 5. In particular, FIG. 5 illustrates welding assemblies 506 at a plurality of welding locations. In one example, the welding assemblies 506 correspond to multiple first tools 202, stringers 402, and susceptors 210, as illustrated in FIG. 4, which are located in an alternating arrangement with a plurality of rotating rods 408. As such, a rotating rod 408 is positioned between adjacent welding assemblies 506 and at the outer ends of the welding assemblies 506 at the far most left and right welding assemblies 506 as viewed in FIG. 5. As can be seen, the rotating rods 408 have corresponding guide rods 412 that direct the pulling force of the susceptor connectors 410 to remove the susceptors 210. It should be noted that only some of the susceptor connectors 410 are shown (illustrated on the left side of FIG. 5) for ease in illustration and susceptor connectors 410 are coupled with all of the susceptors 210.

In operation, with the arrangement illustrated in FIG. 5, a plurality of thermoplastic composite parts (at a plurality of welding positions) and a plurality of susceptor removal devices 212 remove susceptors 210 from the plurality of thermoplastic composite parts during bonding operation. The plurality of susceptor removal devices 212, and more particularly, the rotating rods 408 of the plurality of susceptor removal devices 212, are communicatively coupled to a housing 500 that is one of geared or belted to coordinate or synchronize movement of the plurality of susceptor removal devices 212. In the illustrated example, the housing 500 includes a belt 502 configured as a belt drive that causes coordinated or synchronized movement (rotation) of the rotating rods 408. For example, movement of the belt 502 (as illustrated by the arrows 504) by one or more motors (not shown) causes the rotating rods 408 to rotate clockwise or counterclockwise. Thus, the belt 502 causes rotation of all of the rotating rods 408 at the same time. It should be appreciated that multiple belts 502 can be attached to subsets of the rotating rods 408 to selectively rotate less than all of the rotating rods 408.

It should be appreciated that in some examples, one or more components can be linked together. For example, and with reference to FIG. 4, the first tools 202 can be linked together such as with a frame structure to define a continuous arrangement. Similarly, the second tools 204 can be linked together or can be provided as a single continuous tool member extending across and between multiple welding positions. Additionally, in FIG. 5, the welding assemblies 506, or portions thereof, can be linked together by a common frame structure.

In various examples, the entire structure of one or more of the herein disclosed embodiments (such as illustrated in FIG. 4 or FIG. 5) is housed in a magnetic field. As described herein, the magnetic field induces current in the susceptor wire causing heating. The various components, such as the rods, guides, motor housing, motors, gears, etc. in various examples are non-conductive or non-magnetic materials to prevent stray induced current. In some examples, the entire structure is in a vacuum envelope to provide pressure to the bond line during thermoplastic welding. The gears, belt and rods are protected by the housing to ensure vacuum bag tolerance.

In some examples, due to the vacuum bag and magnetic field, the force for the rods is not generated by a standard electric motor, but instead, for example, from a hydraulic piston to move a lever that rotates the rods. In some examples, a pneumatic motor rotates the gear and/or belt. The rod can rotate for longer distances of the susceptor, but the air for the motor is isolated from the vacuum bag.

As another example, an electric motor with an extended drive shaft is used. For example, an electric motor and a long (e.g., >1 foot) drive shaft is used to separate the electromagnetic field from the motor.

The various examples are configured as a joining system, such as for forming a landing gear door for an aircraft, wherein the susceptors 210 are removed during bonding operation. Accordingly, potential "fly away" components are removed, such as from the welded landing gear door.

As one example, susceptor thermoplastic welding is performed as follows:

1. Assemble and load parts onto the tool (including the susceptors 210).
2. Place the vacuum bag 216 over the assembled parts. The vacuum bag 216 can include induction coils coupled thereto or integrated therewith.
3. Pull vacuum between the vacuum bag 216 and the tool.
4. Energize the induction coils using a 150 kilohertz (KHz) to 300 KHz current.
5. Maintain the current from 1 to 3 minutes.
6. Remove the susceptors 210 while the current is maintained (i.e., during bonding).
7. Turn off power and let cool for 10 to 15 minutes and remove from tool.

It should be noted that the process described above can be varied as desired or needed, such as based on the welding requirements for the part. For example, the frequency to energize the induction coil and/or the amount of time the current is maintained can be varied to suit different induction welding applications, such as to form different types of parts.

Various examples allow for assembly of integrally stiffened composite panels using controlled directional magnetic flux induced co-cure or thermal welding in a single manufacturing process with no "fly away" parts. Different integrally stiffened composite panels can be assembled or formed in accordance with the present disclosure. For example, the landing gear door can be assembled in a single manufacturing step.

Figure 6:
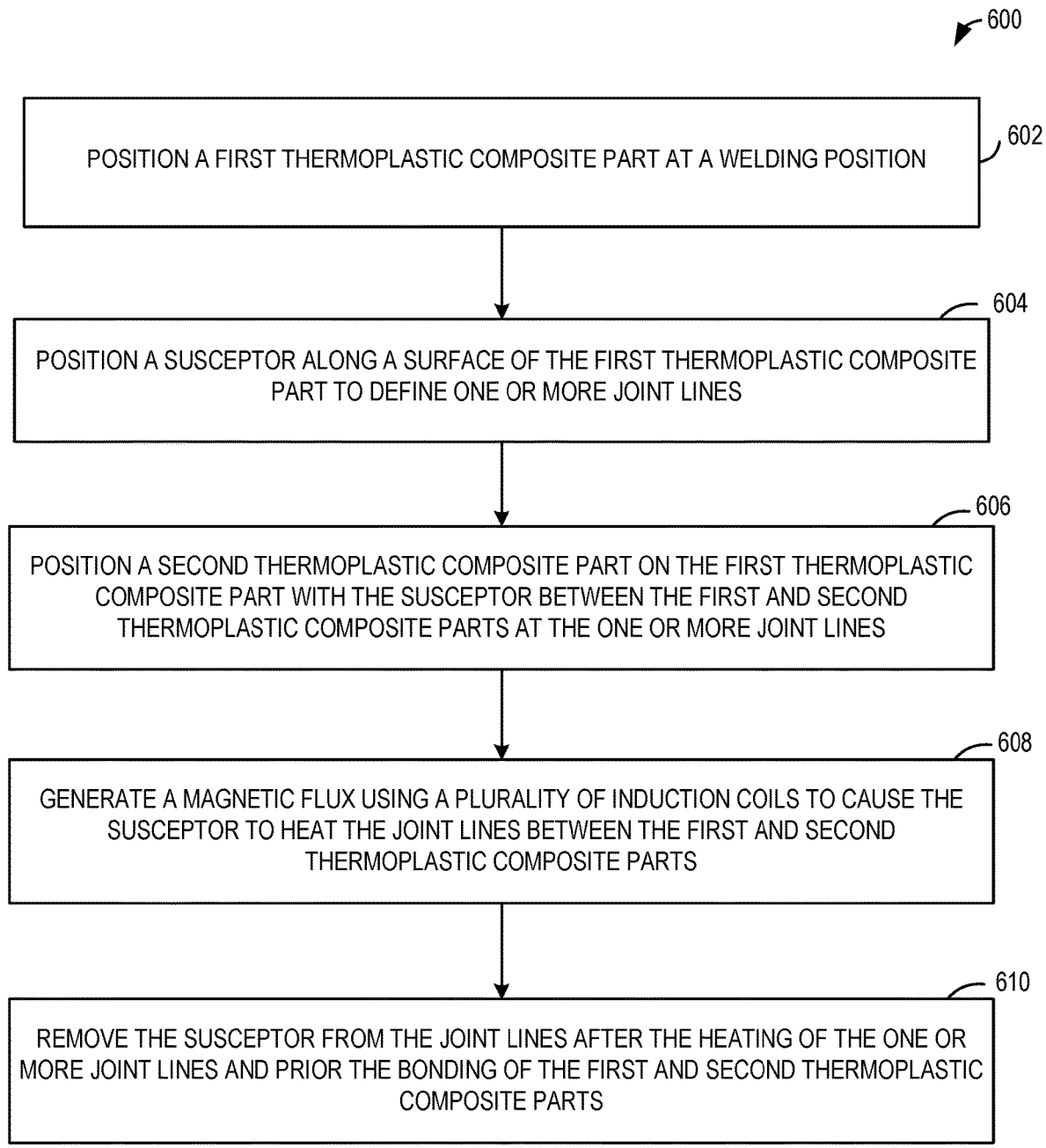
FIG. 6 is a flow chart illustrating a method for thermoplastic welding according to an embodiment of the present disclosure.

FIG. 6 is an illustration of a flowchart of a method 600 for thermoplastic welding, such as for forming an integrally stiffened composite panel in accordance with one or more examples. The method 600 can be implemented, for example, to assemble one or more parts of an aircraft. It should be noted that the steps in the method 600 can be performed in a different order than shown, one or more steps can be added or removed, and the steps can be performed concurrently, simultaneously or sequentially.

The method 600 includes positioning a first thermoplastic composite part at a welding position at 602 and positioning a susceptor along a surface of the first thermoplastic composite part to define one or more joint lines at 604. For example, as described herein, a first thermoplastic composite part can be positioned on a tool having a plurality of induction coils configured to generate a magnetic flux. A second thermoplastic composite part is then position on the first thermoplastic composite part at 606 with the susceptor between the first and second thermoplastic composite parts at the one or more joint lines. Thus, a stacked arrangement of thermoplastic composite parts to be induction welded is thereby arranged.

The method 600 includes generating a magnetic flux at 608 using the plurality of induction coils to cause the susceptor to heat the joint lines between the first and second thermoplastic composite parts. As described herein, the first and second thermoplastic composite parts are melted along the one or more joint lines as the susceptor increases in temperature. That is, the first and second thermoplastic composite parts are heated along the one or more joint lines causing the first and second thermoplastic composite parts to melt along the one or more joint lines. The heating of the susceptor thereby causes localized thermoplastic welding along the joint lines to form melted resin along the one or more joint lines. It should be noted that in some examples, a plurality of localized susceptor elements are positioned along the one or more joint lines. The plurality of localized susceptor elements in some examples are of a predetermined type or positioned at predetermined locations along the joint lines The susceptor is removed from the joint lines at 610 after the heating of the one or more joint lines and prior to the bonding of the first and second thermoplastic composite parts. As described herein, a susceptor removal device applies a force to the susceptor to remove the susceptor from between the first and second thermoplastic composite parts. For example, a pulling force is applied to the susceptor to remove the susceptor from the one or more joint lines. In some examples, the removing of the susceptors is performed concurrently with the application of a compactive load. In some examples, with the generated magnetic flux causing the susceptor to be heated to result in a resin melt bond line along the joint line, the susceptor is drawn out from the resin melt bond line under a tension loading (e.g., removing the susceptor using a rotating rod, wherein the removed susceptor is guided to the rotating rod by one or more guide rods) when resin in the resin melt bond line reaches a predetermined temperature.

It should be noted that one or more components used to assemble the integrally stiffened composite panel are formed of a material that is magnetically opaque to a frequency in the range of 30 KHz to 350 KHz in some examples. However, different material can be used to be magnetically opaque at other frequencies. In the method 600, the tooling can be formed of the magnetically opaque material.

Figure 7:
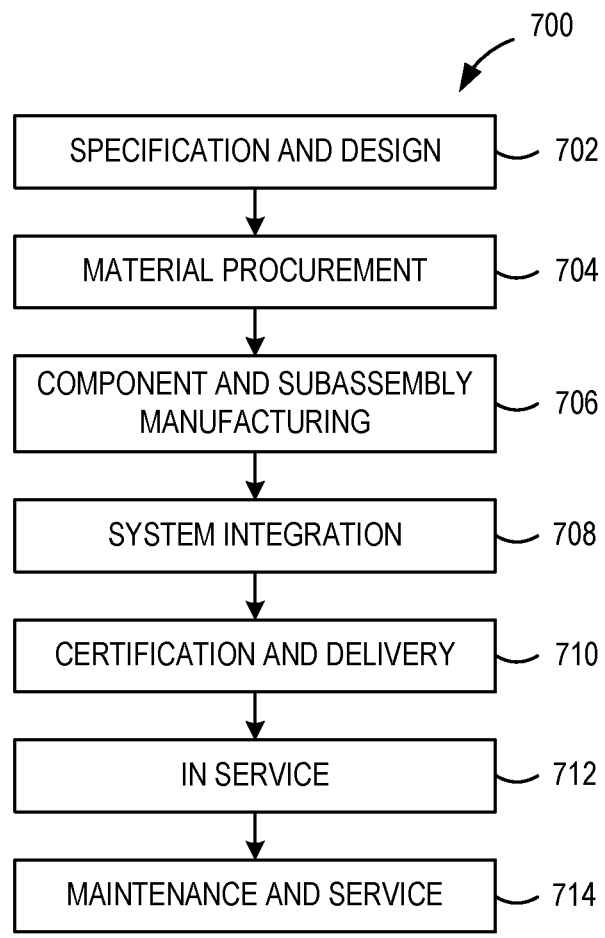
FIG. 7 is a block diagram of an aircraft production and service methodology.

Examples of the disclosure can be described in the context of an aircraft manufacturing and service method 700 as shown in FIG. 7. During pre-production, illustrative method 700 can include specification and design 702 of an aircraft (e.g., aircraft 100 shown in FIG. 1) and material procurement 704. During production, component and subassembly manufacturing 706 and system integration 708 of the aircraft take place. Thereafter, the aircraft can go through certification and delivery 710 to be placed in service 712. While in service by a customer, the aircraft is scheduled for routine maintenance and service 714 (which can also include modification, reconfiguration, refurbishment, and so on).

Each of the processes of the illustrative method 700 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as the automotive industry.

Apparatus and methods shown or described herein can be employed during any one or more of the stages of the manufacturing and service method 700. For example, components or subassemblies corresponding to component and subassembly manufacturing 706 can be fabricated or manufactured in a manner similar to components or subassemblies produced while the aircraft is in service. Also, one or more aspects of the apparatus, method, or combination thereof can be utilized during the production states of subassembly manufacturing 706 and system integration 708, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 714.

Thus, various examples facilitate induction welding of thermoplastic composite assemblies such as integrally stiffened composite panels. The present disclosure, including the examples described herein, can be implemented using different manufacturing environments. An example of one manufacturing environment will now be described.

Exemplary Manufacturing Environment

Figure 8:
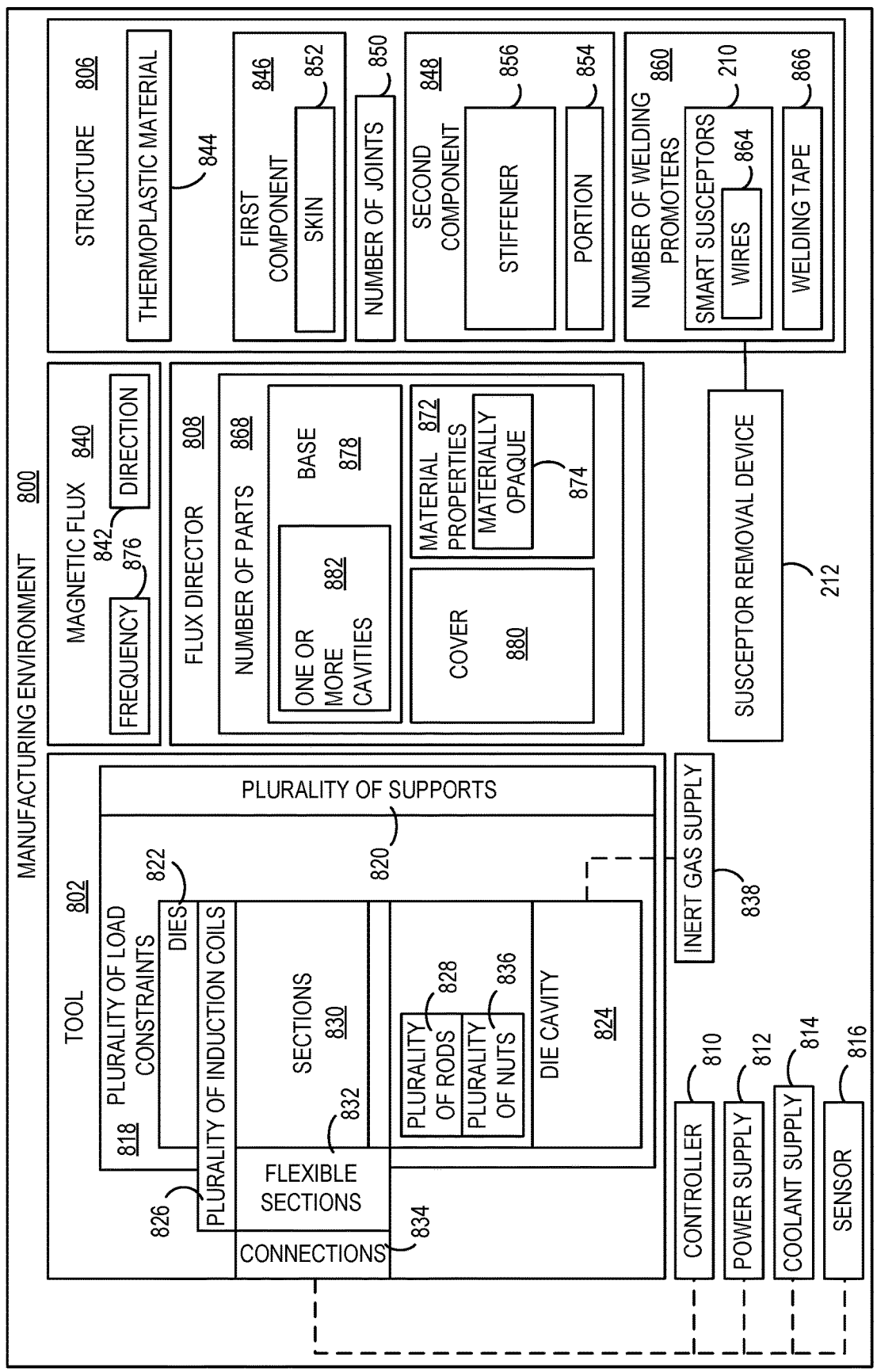
FIG. 8 is a block diagram of a manufacturing environment according to an embodiment of the present disclosure.

The present disclosure is operable within a manufacturing environment 800 as illustrated in the functional diagram of FIG. 8. In this illustrative example, the manufacturing environment 800 is depicted in block form to illustrate different components for one or more illustrative examples. FIG. 8 illustrates one exemplary configuration in which susceptor removal according the present disclosure can be implemented.

In this depicted example, the manufacturing environment 800 generally includes a tool 802, a structure 806, a flux director 808, a controller 810, a power supply 812, a coolant supply 814, and a sensor 816.

The tool 802 is configured to weld a structure 806, such as to induction weld an integrally stiffened thermoplastic composite panel. Welding in various examples results in joining at least two components to form the structure 806.

The tool 802 comprises a plurality of load constraints 818 supported by a plurality of supports 820. The tool 802 also comprises one or more dies 822 located within a plurality of load constraints 818. A die cavity 824 is created in some examples and configured to contain the structure 806 during assembling the process (e.g., a vacuum cavity wherein the structure 806 is maintained during induction welding).

The die(s) 822 can be formed of a material that is not susceptible to inductive heating. In some examples, the die(s) 822 are formed from a ceramic, a composite, a phenolic, or some other desirable material. In one example, the material for the die(s) 822 is selected based on a coefficient of thermal expansion, thermal shock resistance, and/or compression strength. In this example, the material can be selected to have a low coefficient of thermal expansion, desirable thermal shock resistance, and relatively high compression strength. In one example, the die(s) 822 can be a castable fused silica ceramic.

The die(s) 822 contain a plurality of induction coils 826 and plurality of rods 828. The plurality of induction coils 826 have sections 830 and flexible sections 832, such as embedded within an elastomeric layer, in some examples as described herein. The sections 830 of plurality of induction coils 826 are also embedded in the die(s) 822 in various examples. In some examples, the sections 830 extend along the length of the die(s) 722.

The plurality of induction coils 826 are connected to the controller 810, the power supply 812, the coolant supply 814, and the sensor 816 through connectors 834. The controller 810 is configured to control the input power fed to plurality of induction coils 826 by the power supply 812. By controlling the input power, the controller 810 controls the magnetic flux produced by plurality of induction coils 826. By controlling the magnetic flux produced by plurality of induction coils 826, the controller 810 also controls the operating temperature of the tool 802.

The controller 810 can be implemented in software, hardware, firmware or a combination thereof. When software is used, the operations performed by the controller 810 can be implemented in program code configured to run on a processor. When firmware is used, the operations performed by controller 810 can be implemented in program code and data and stored in persistent memory to run on a processor. When hardware is employed, the hardware can include circuits that operate to perform the operations in the controller 810.

The coolant supply 814 is configured to supply coolant to one or more coils of the plurality of induction coils 826. The coolant flowing through the plurality of induction coils 826 functions as a heat exchanger to transfer heat out of the tool 802, such as to cool one or more bond lines after heating. The sensor 816 is configured to measure a temperature of a portion of the tool 802 during operation.

The plurality of rods 828 are embedded within the die(s) 822. The plurality of rods 828 provide reinforcement for the die(s) 822. In one example, the plurality of rods 828 is formed from fiberglass. The plurality of rods 828 can be threaded on the ends and can be held in place by a plurality of nuts 836. The plurality of nuts 836 can be installed to apply tension to the plurality of rods 828. In some examples, the plurality of rods 828 extend longitudinally through the die(s) 822. In some examples, the plurality of rods 828 extend transversely through the die(s) 822. In some examples, the plurality of rods 828 extend both longitudinally and transversely through the die(s) 822.

The die cavity 824 is associated with an inert gas supply 838 or a vacuum space. Thus, during assembly (e.g., consolidation) of the structure 806, inert gas from the inert gas supply 838 can be present in the die cavity 824. In some examples, a vacuum cavity is formed.

The plurality of induction coils 826 generate magnetic flux 840. The magnetic flux 840 runs in a direction 842. The direction 842 can be substantially perpendicular to the plurality of induction coils 826. The direction 842 is non-parallel to at least a portion of the structure 806 in some examples. For example, the direction 842 can be substantially perpendicular to at least a portion of structure 806.

The structure 806 is formed of thermoplastic material 844. The structure 806 can include a first component 846 and a second component 848. The first component 846 and the second component 848 can be connected by a number of joints 850. The first component 846 is in the form of one or more skins 852 in some examples. The skin 852 can be positioned to be substantially parallel to the direction 842 of magnetic flux 740.

The second component 848 can have a portion 854 that is substantially non-parallel to the direction 842 of magnetic flux 840. In some examples, the second component 848 is in the form of a stiffener 856.

The structure 806 includes a number of welding promoters 860. The welding promoters 860 are positioned in the joints 850 (e.g., at surfaces between two abutting components). Prior to welding, the welding promoters 860 are positioned such that the welding promoters 860 contact the surface of the first component 846 and the surface of the second component 848. During the welding, the welding promoters 860 are removed from the joints 850 as described herein using the susceptor removal device 212.

In some examples, the welding promoters 860 include the susceptors 210. The susceptors 210 are formed of a material configured to generate heat when exposed to the magnetic flux 840. The material of the susceptors 210 can be selected as described herein. The susceptors 210 can generate heat when exposed to the magnetic flux 840 generated by the plurality of induction coils 826 as described herein (e.g., apply heat to the joints 850 of the structure 806 during a welding process).

In some examples, the susceptors 210 take the form of wires 864. When the welding promoters 860 are placed between the first component 846 and the second component 848, the welding promoters 860 can be placed such that the wires 864 are substantially parallel to the direction 842 of the magnetic flux 840. In some examples, the welding promoters 860 take the form of welding tape 866 having the susceptors 210 in the form of the wires 864. It should be appreciated that any suitable welding promoter can be used and will be removed in accordance with the examples described herein using the susceptor removal device 212.

To weld the structure 806, a flux director 808 is placed into the die cavity 824 of the tool 802. The first component 846 and the second component 848 are placed in relation to the flux director 808 in the tool 802. The plurality of induction coils 826 then are activated to generate the magnetic flux 840. The flux director 808 directs magnetic flux 840 to the joints 850. In some examples, when the flux director 808 changes the direction 842 of the magnetic flux 840, the flux director 808 is referred to as focusing, directing, or channeling the magnetic flux 840. In some examples, the flux director 808 is an active flux director (e.g., an aluminum part that redirects or changes the course of the magnetic flux 840). In some examples, the flux director 808 is a passive flux director that allows the magnetic flux 840 to pass through.

Thus, during the welding of the structure 806, the first component 846 and the second component 848 are melted along the joints 850 from the heat generated by the susceptors 210, and during the welding, the susceptors 210 are removed by the susceptor removal device 212.

The flux director 808 includes a number of parts 868 that have material properties 872. The material properties 872 can include desirable properties for at least one of conductivity, machinability, melting temperature, elasticity, material cost, or other material characteristics of the flux director 808. The material properties 872 can include the material being magnetically opaque 874. A material can be selected for the parts 868 based on a frequency 876 of the magnetic flux 840. In some examples, the frequency 876 is in the range of 30 KHz to 350 KHz. As a result, magnetically opaque 874 means opaque to the magnetic flux 840 having the frequency 876 in the range of 30 KHz to 350 KHz in some examples. In one example, the flux director 808 is formed of aluminum or an aluminum alloy. The flux director 808 is formed having conductive material properties to control directional magnetic flux induced co-cure or thermal welding as described in more detail herein. It should be appreciated that the material properties and operating characteristics are merely examples, and the present disclosure can be implemented using different arrangements.

The parts 868 can include a base 878 and a cover 880. The base 878 can include one or more cavities 882, which can be partially formed by the cover 880, for example, as a vacuum chamber that provides weld pressure. The structure 806 can be inserted into the one or more cavities 882. The cover 880 (e.g., a vacuum bag) can be placed over the structure 806.

The illustration of the manufacturing environment 800 is not meant to imply physical or architectural limitations to the manner in which an illustrative example is implemented. Other components in addition to or in place of the ones illustrated can be used. Some components can be removed. Also, the blocks are presented to illustrate some functional components. One or more of these blocks can be combined, divided, or combined and divided into different blocks when implemented in an illustrative example.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for forming or assembling integrally stiffened thermoplastic composite panels.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps) is within the scope of aspects of the disclosure.

The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The following clauses describe further aspects:

Clause Set A:

A1. An apparatus for thermoplastic welding, the apparatus comprising:

at least one tool configured to support first and second thermoplastic composite parts in a first welding position having one or more joint lines between the first and second thermoplastic composite parts, wherein the at least one tool comprises a plurality of induction coils;

a susceptor removably positioned along the one or more joint lines, the susceptor configured to heat the one or more joint lines when exposed to a magnetic flux generated by the plurality of induction coils to bond the first and second thermoplastic composite parts along the one or more joint lines; and a susceptor removal device coupled to the susceptor and configured to remove the susceptor during bonding of the first and second thermoplastic composite parts.

A2. The apparatus of clause A1, wherein the susceptor removal device comprises a rotating rod positioned adjacent to the first and second thermoplastic composite parts and rotatable to remove the susceptor from the one or more joint lines.

A3. The apparatus of clause A2, wherein the at least one tool is configured to support a third thermoplastic composite part in a second welding position having one or more joint lines between the second and third thermoplastic composite parts, wherein the susceptor removal device is positioned between the first and second welding positions.

A4. The apparatus of clause A3, further comprising a guide rod aligned with each of (i) the first and second thermoplastic composite parts and (ii) the second and third thermoplastic composite parts, the guide rod configured to direct a pulling force in a direction parallel to the one or more joint lines.

A5. The apparatus of clause A3, further comprising a protective layer positioned along an exit direction of the susceptors from the (i) the first and second thermoplastic composite parts and (ii) the second and third thermoplastic composite parts, the protective layer positioned between the susceptor and the first thermoplastic composite part.

A6. The apparatus of clause A2, further comprising a third thermoplastic composite part in a second welding position having one or more joint lines between the second and third thermoplastic composite parts, wherein the susceptor removal device is positioned between the first and second welding positions and rotation of the rotating rod in a one direction removes the susceptor from the one or more joint lines at the first welding position and rotation of the rotating rod in a second direction opposite to the first direction removes the susceptor from the one or more joint lines at the second welding position.

A7. The apparatus of any of clause A1 to A6, further comprising a plurality of tools including a top tool and a bottom tool, the top tool configured to shield induced current within the first and second thermoplastic composite parts and the susceptor.

A8. The apparatus of any of clauses A1 to A7, further comprising at least one temperature sensor positioned to measure a temperature of melted resin along the one or more joint lines, and wherein the susceptor removal device is configured to remove the susceptor under a tension loading when the melted resin reaches at least a predetermined temperature.

A9. The apparatus of any of clauses A1 to A8, further comprising a plurality of additional welding positions and a plurality of susceptor removal devices between the plurality of additional welding positions, the plurality of susceptor removal devices communicatively coupled to a housing that is one of geared or belted to define a drive system that synchronizes movement of the plurality of susceptor removal devices to remove the susceptors at the additional welding positions.

Clause Set B:

B1. A method for thermoplastic welding, the method comprising:

positioning a first thermoplastic composite part at a welding position;

positioning a susceptor along a surface of the first thermoplastic composite part to define one or more joint lines;

positioning a second thermoplastic composite part on the first thermoplastic composite part with the susceptor between the first and second thermoplastic composite parts at the one or more joint lines;

generating a magnetic flux using a plurality of induction coils to cause the susceptor to heat the one or more joint lines between the first and second thermoplastic composite parts; and removing the susceptor from the one or more joint lines after the heating of the one or more joint lines and prior to the bonding of the first and second thermoplastic composite parts.

B2. The method of clause B1, wherein the heating of the susceptor causes localized thermoplastic welding along the one or more joint lines to form melted resin along the one or more joint lines with the susceptor removed from the melted resin.

B3. The method of clause B1 or B2, wherein the susceptor comprises a plurality of localized susceptor elements along the one or more joint lines, and the plurality of localized susceptor elements are at least one of a predetermined type or positioned at predetermined locations along the one or more joint lines.

B4. The method of any of clauses B1 to B3, wherein the removing of the susceptors is performed concurrently with the application of a compactive load and further comprising cooling the one or more joint lines after removal of the susceptor.

B5. The method of any of clauses B1 to B4, wherein the generated magnetic flux causes the susceptor to be heated to result in a resin melt bond line along the joint line, and removing the susceptor comprises drawing out the susceptor from the resin melt bond line under a tension loading when resin in the resin melt bond line reaches a predetermined temperature.

B6. The method of any of clauses B1 to B5, further comprising positioning a protective layer between a removed susceptor portion and a portion of a thermoplastic sheet forming one of the thermoplastic composite parts.

B7. The method of any of clauses B1 to B6, further comprising removing the susceptor using a rotating rod, wherein the removed susceptor is guided to the rotating rod by one or more guide rods.

Clause Set C:

C1. A system for thermoplastic welding, the system comprising:

a tool configured to support first and second thermoplastic composite parts in a first welding position having one or more joint lines between the first and second thermoplastic composite parts;

a magnetic field generator configured to generate magnetic flux;

a susceptor removably positioned along the one or more joint lines, the susceptor configured to heat the one or more joint lines when exposed to the magnetic flux to bond the first and second thermoplastic composite parts along the one or more joint lines; and a susceptor removal device coupled to the susceptor and configured to remove the susceptor during bonding of the first and second thermoplastic composite parts.

C2. The system of clause C1, wherein the magnetic field generator comprises a plurality of induction coils positioned within the tool.

C3. The system of clause C1 or C2, wherein the removable susceptor is configured to allow for removal by a pulling force in a direction parallel to the one or more joint lines.

C4. The system of any of clauses C1 to C3, further comprising a protective layer positioned along at least a portion of the tool in a direction of applied force by the susceptor removal device.

What is claimed is:

1. An apparatus for thermoplastic welding, the apparatus comprising:

at least one tool configured to support first and second thermoplastic composite parts in a first welding position having one or more joint lines between the first and second thermoplastic composite parts, wherein the at least one tool comprises a plurality of induction coils;

a susceptor removably positioned along the one or more joint lines, the susceptor configured to heat the one or more joint lines when exposed to a magnetic flux generated by the plurality of induction coils to bond the first and second thermoplastic composite parts along the one or more joint lines; and a susceptor removal device coupled to the susceptor and configured to direct a pulling force parallel to the one or more joint lines to remove the susceptor from the one or more joint lines during bonding of the first and second thermoplastic composite parts.

2. The apparatus of claim 1, wherein the susceptor removal device comprises a rotating rod positioned adjacent to the first and second thermoplastic composite parts and rotatable to remove the susceptor from the one or more joint lines using the pulling force set at a level to overcome a resistance of melted material during bonding of the first and second thermoplastic parts.

3. The apparatus of claim 2, wherein the at least one tool is configured to support a third thermoplastic composite part in a second welding position having one or more joint lines between the second and third thermoplastic composite parts, wherein the susceptor removal device is positioned between the first and second welding positions.

4. The apparatus of claim 3, further comprising a guide rod aligned with each of (i) the first and second thermoplastic composite parts and (ii) the second and third thermoplastic composite parts, the guide rod configured to direct the pulling force in the direction parallel to the one or more joint lines.

5. The apparatus of claim 3, further comprising a protective layer positioned along an exit direction of the susceptor from the (i) the first and second thermoplastic composite parts and (ii) the second and third thermoplastic composite parts, the protective layer positioned between the susceptor and the first thermoplastic composite part.

6. The apparatus of claim 2, further comprising a third thermoplastic composite part in a second welding position having one or more joint lines between the second and third thermoplastic composite parts, wherein the susceptor removal device is positioned between the first and second welding positions and rotation of the rotating rod in a first direction removes the susceptor from the one or more joint lines at the first welding position and rotation of the rotating rod in a second direction opposite to the first direction removes the susceptor from the one or more joint lines at the second welding position.

7. The apparatus of claim 1, further comprising a plurality of tools including a top tool and a bottom tool, the top tool configured to shield induced current within the first and second thermoplastic composite parts and the susceptor.

8. The apparatus of claim 1, further comprising at least one temperature sensor positioned to measure a temperature of melted resin along the one or more joint lines, and wherein the susceptor removal device is configured to remove the susceptor under a tension loading when the melted resin reaches at least a predetermined temperature.

9. The apparatus of claim 1, further comprising a plurality of additional welding positions and a plurality of susceptor removal devices between the plurality of additional welding positions, the plurality of susceptor removal devices communicatively coupled to a housing that is one of geared or belted to define a drive system that synchronizes movement of the plurality of susceptor removal devices to remove susceptors at the additional welding positions.

10. A method for thermoplastic welding, the method comprising:

positioning a first thermoplastic composite part at a welding position;

positioning a susceptor along a surface of the first thermoplastic composite part to define one or more joint lines;

positioning a second thermoplastic composite part on the first thermoplastic composite part with the susceptor between the first and second thermoplastic composite parts at the one or more joint lines;

generating a magnetic flux using a plurality of induction coils to cause the susceptor to heat the one or more joint lines between the first and second thermoplastic composite parts; and removing the susceptor from the one or more joint lines after the heating of the one or more joint lines and prior to bonding of the first and second thermoplastic composite parts by directing a pulling force parallel to the one or more joint lines.

11. The method of claim 10, wherein the heating by the susceptor causes localized thermoplastic welding along the one or more joint lines to form melted resin along the one or more joint lines with the susceptor removed from the melted resin.

12. The method of claim 10, wherein the susceptor comprises a plurality of localized susceptor elements along the one or more joint lines, and the plurality of localized susceptor elements are at least one of a predetermined type or positioned at predetermined locations along the one or more joint lines.

13. The method of claim 10, wherein the removing of the susceptor is performed concurrently with an application of a compactive load and further comprising cooling the one or more joint lines after removal of the susceptor.

14. The method of claim 10, wherein the generated magnetic flux causes the susceptor to be heated to result in a resin melt bond line along the one or more joint lines, and removing the susceptor comprises drawing out the susceptor from the resin melt bond line under a tension loading when resin in the resin melt bond line reaches a predetermined temperature.

15. The method of claim 10, further comprising positioning a protective layer between a removed susceptor portion and a portion of a thermoplastic sheet forming one of the first or second thermoplastic composite parts.

16. The method of claim 10, further comprising removing the susceptor using a rotating rod, wherein the removed susceptor is guided to the rotating rod by one or more guide rods.

17. A system for thermoplastic welding, the system comprising:

a tool configured to support first and second thermoplastic composite parts in a first welding position having one or more joint lines between the first and second thermoplastic composite parts;

a magnetic field generator configured to generate magnetic flux;

a susceptor removably positioned along the one or more joint lines, the susceptor configured to heat the one or more joint lines when exposed to the magnetic flux to bond the first and second thermoplastic composite parts along the one or more joint lines; and a susceptor removal device coupled to the susceptor and configured to direct a pulling force parallel to the one or more joint lines to remove the susceptor from the one or more joint lines during bonding of the first and second thermoplastic composite parts.

18. The system of claim 17, wherein the magnetic field generator comprises a plurality of induction coils positioned within the tool.

19. The system of claim 17, wherein the susceptor is configured to allow for removal by the pulling force in the direction parallel to the one or more joint lines, the pulling force set at a level to overcome a resistance of melted material during bonding of the first and second thermoplastic parts.

20. The system of claim 17, further comprising a protective layer positioned along at least a portion of the tool in a direction of applied force by the susceptor removal device.

* * * * *